Feb. 19, 1924.

C. C. CLELAND

POWER TRANSMITTER

Filed July 11, 1918

Inventor:
Chester C. Cleland
By Thurston & Kwis
attys.

Patented Feb. 19, 1924.

1,484,061

UNITED STATES PATENT OFFICE.

CHESTER C. CLELAND, OF CLEVELAND, OHIO.

POWER TRANSMITTER.

Application filed July 11, 1918. Serial No. 244,355.

*To all whom it may concern:*

Be it known that I, CHESTER C. CLELAND, a citizen of the United States, residing at Cleveland, in the county of Cuyahoga and State of Ohio, have invented a certain new and useful Improvement in Power Transmitters, of which the following is a full, clear, and exact description.

This invention relates to a power transmitter adapted especially for transmitting power from a constantly rotating shaft to a machine or device which is used intermittently, being particularly adapted for, but not necessarily confined to a power transmitter for sewing machines.

The principal object of the invention is to provide a power transmitter which is simple in construction, efficient and durable, and which is so constructed that there is no loss of power by friction when the device is idle or not transmitting power to the driven member or machine.

The above mentioned objects and other more specific objects which will be apparent from the following description, are attained by my invention, which while capable of being embodied in a number of forms, has for its principal feature a clutch such as a cone clutch, one element of which is fixed to the rotating or driving shaft, and the other element of which transmits power to the load, and is so mounted that when out of clutching engagement with the rotating clutch element it is entirely free of the rotating shaft but is, nevertheless, preferably supported and journaled on a member which is concentric with respect to the shaft, but likewise free or out of contact therewith.

Figure 4:
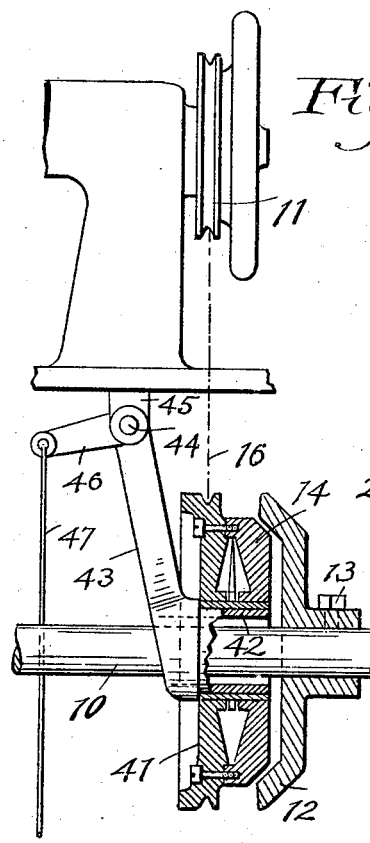
Figure 1:
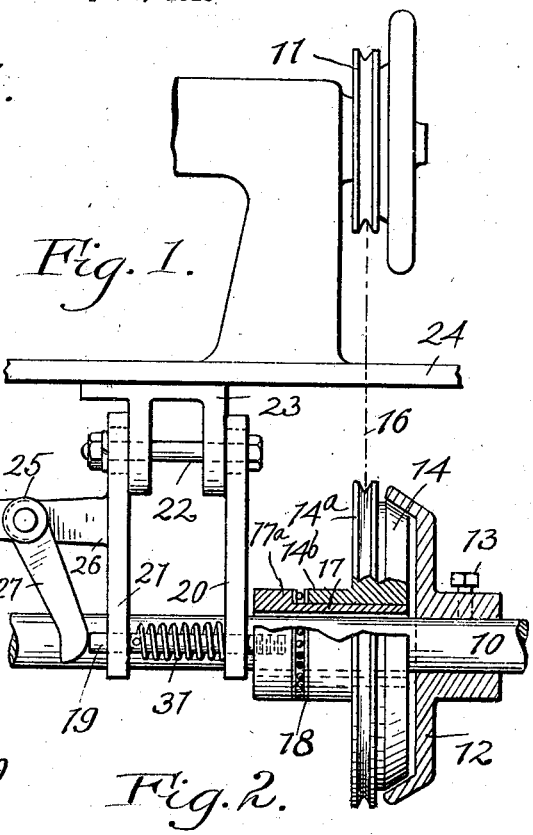
Figure 3:
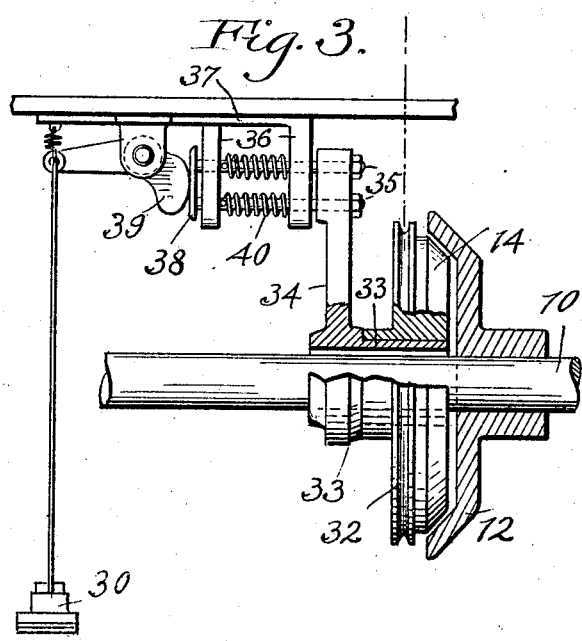
Figure 2:
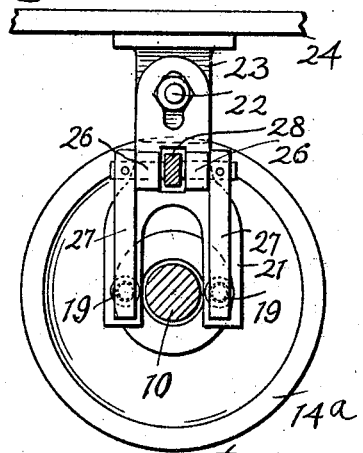

Some of the different ways in which the principle of my invention may be carried out are illustrated in the accompanying drawings wherein Fig. 1 is a view, partly in side elevation and partly in section, of one embodiment of my invention adapted as a power transmitter for a sewing machine; Fig. 2 is a cross-sectional view substantially along the line 2—2 of Fig. 1; Fig. 3 is a view similar to Fig. 1, showing a slight modification; Fig. 4 is a view similar to Fig. 1, showing a further modification.

My improved transmitter is utilized with a driving shaft 10, which may be considered a constantly rotating shaft, and is utilized to transmit power in some manner or another, as by a belt, or gears, in this case by a belt, to a device such as a pulley 11, of a sewing machine, or to any other member designed to be mechanically connected to and disconnected from the rotating shaft 10.

The transmitter includes a rotating clutch member 12, which is secured by a set-screw 13, or otherwise, to the shaft. The transmitter includes also an axially movable clutch member 14, designed to be moved whenever desired, into and out of clutching engagement with the clutch member 12. In this instance, a clutch of the cone type is illustrated, but this form of clutch is not essential to the invention, although it is preferred. This clutch member 14 has a portion 14$^a$ with a grooved periphery, and connected by a belt 16 to the pulley 11. As before stated, however, it is not essential that power be transmitted from the clutch member 14 to the driven part 11 by a belt, as a gear form of transmission could be employed.

The principal feature of this invention is the mounting and manner of supporting and shifting the movable clutch member 14. It will be observed that this clutch member is journaled on a sleeve 17 which surrounds and is concentric with the shaft but is neither supported on nor touching the shaft. The sleeve 17 does not rotate, but is mounted for slight endwise movement, and the clutch member 14 is stationarily supported on this sleeve when no power is being transmitted, but rotates freely thereon when power is being transmitted, or when it is in clutching engagement with the clutch member 12. The bearing surfaces of the clutch member 14 and its supporting sleeve 17 may be lubricated in any desired manner, and there is preferably a thrust ball bearing 18 between the end of the hub 14$^b$ of the clutch member 14 and a shoulder 17$^a$ near the outer end of the sleeve 17.

The sleeve 17 is mounted for endwise movement axially of the shaft to throw the clutch member 14 into and out of engagement with the clutch member 12, and this is accomplished in this instance by a pair of pins 19, mounted for endwise sliding movement in the lower ends of two forked brackets 20 and 21, secured by a bolt 22, to a stationary support 23, in this instance above the shaft 10, and secured to the base 24 of the sewing machine. These two sleeve supporting pins 19 which are on diametrically opposite sides of the shaft 10 have their forward ends attached to the outer end of the sleeve 17, and in this instance the ends of the pins are threaded and are screwed into threaded sockets in the outer end of the sleeve.

The pins 19 are moved forwardly to shift the sleeve forwardly along the shaft and cause the clutch member 14 to clutch the clutch member 12 by a bell-crank 25 pivoted to a lug 26 projecting laterally from the bracket 21, this bell-crank having a forked lower end 27 which engages the outer ends of the pins 19, which project a short distance beyond the bracket 21. The other arm 28 of the bell-crank is connected by a rod 29 or other shifting member to a foot pedal or equivalent device which is operated when it is desired to throw the clutch in or out, a foot pedal being shown conventionally at 30 in Fig. 3.

Between the pin supporting brackets 20 and 21 are coil springs 31 which surround the pins 19. These springs are compressed when the pins are moved forwardly by depressing the foot pedal to throw the clutch in, and when the pedal is released these springs throw the clutch out, and in so doing move the pins 19, the sleeve 17 and the clutch member 14 axially of the shaft or away from the clutch member 12.

In Fig. 3 I have shown a quite similar construction but with the supporting sleeve for the movable clutch member mounted and operated in a somewhat different manner. In this case the movable clutch member here designated 32 is journaled on a sleeve 33 which is concentric with respect to, but does not touch the shaft 10, this sleeve being at the lower end of a vertical supporting arm 34 whose upper end is fixed to a pair of sliding bolts 35, guided for endwise movement in ears 36 of a bracket 37, the rear or outer ends of these bolts having a head 38 engaged by a pivoted bell-crank 39 connected to a foot pedal or equivalent shifting device as in Fig. 1. Springs 40 which surround the pins or bolts 35 between the ears 36 of the bracket 37 are compressed when the clutch is thrown in, and throw the clutch out when the foot pedal or equivalent device is released.

In the construction of Fig. 4 the movable clutch member here designated 41 is journaled on a sleeve 42 which surrounds but at all times is clear of the shaft 10, this supporting sleeve 42 being fixed to or integral with an arm 43 which is pivoted at 44 to a supporting bracket or equivalent device 45. A second arm 46 forms with the sleeve supporting arm 43, the equivalent of a bell-crank, and is shifted by a rod 47 as in the first instances.

In this case the clutch member 41 has a hollow chamber designed to be filled with lubricant so as to be self-oiling although this feature is not at all essential to the invention.

It will be observed that whereas with the constructions of Figs. 1, 2 and 3 the clutch is thrown in and out by a purely endwise movement relative to the shaft, in the construction of Fig. 4 this is accomplished by a swinging or rocking movement. The prior constructions are preferable in certain respects to the one last described, for with the latter construction greater care must be exercised than with the first described constructions in mounting the movable part of the clutch so it will engage all around the periphery when it is swung to clutching position.

It will be seen that with all constructions although the movable clutch member is supported concentrically or substantially concentrically with respect to the shaft, it is journaled on a non-rotating member which while likewise having a portion surrounding the shaft is out of engagement therewith so that no power or energy is lost in friction when the clutch is thrown out. This is of material advantage over prior constructions having a clutch member which is directly or indirectly supported on the shaft when the clutch is out.

Having described my invention, I claim:

In combination with a driving shaft, a power transmitting mechanism for transmitting power from the shaft to a member to be driven and comprising a clutch member fixed to the shaft, a second clutch member adapted to be shifted axially of the shaft into and out of engagement with the first-named clutch member, a supporting sleeve surrounding the shaft and free thereof and supported independently of the shaft, said second clutch member being rotatably supported by said sleeve, and means for shifting said sleeve and the second clutch member to move the latter axially of the shaft.

In testimony whereof, I hereunto affix my signature.

CHESTER C. CLELAND.